Patented Mar. 3, 1925.

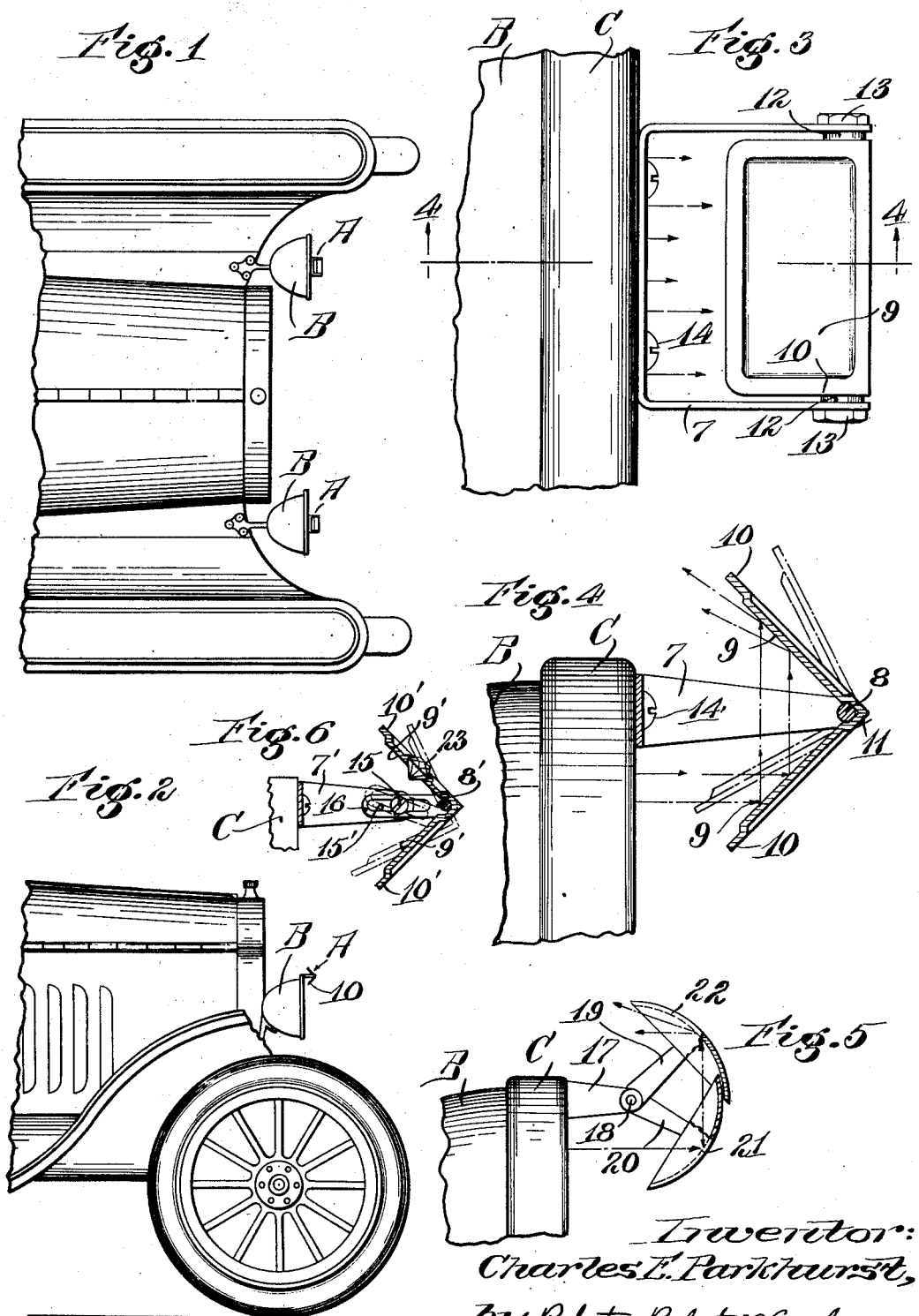

1,528,562

UNITED STATES PATENT OFFICE.

CHARLES E. PARKHURST, OF SOMERVILLE, MASSACHUSETTS.

TELLTALE FOR AUTOMOBILE HEADLIGHTS.

Application filed November 15, 1922. Serial No. 601,083.

*To all whom it may concern:*

Be it known that I, CHARLES E. PARKHURST, a citizen of the United States of America, and resident of Somerville, in the county of Middlesex and State of Massachusetts, have invented new and useful Improvements in Telltales for Automobile Headlights, of which the following is a specification.

This invention relates to devices for giving at a distance a visual indication of the condition of lighting apparatus, and more particularly to means by which the driver of a motor vehicle may be constantly advised from his seat when driving at night as to whether his headlights are "on" or "off."

According to law an automobilist is required to show two white lights ahead. Failure to do so renders him liable to arrest, summons, or at least a hold-up by the police. When driving in the open country where street lights are infrequent or entirely lacking, the driver is always advised in relation to his lights by the illumination of the road ahead even if the lights are dimmed. In city driving through well-lighted streets, however, the case is entirely different for it is then difficult and often practically impossible for the driver to tell whether the lights are on or not, even when used with full power. Occasionally a motorist runs for some distance with his lights entirely "off" due to inadvertently operating the wrong switch when he intended to change his lights from "full on" to dim, and there is always the chance that the lights may fail due to burned out bulbs or to a short circuit in the wiring system.

Objects of the invention are to make it possible for the motorist to know at all times whether each light is burning, to provide devices for this purpose which are inexpensive to make, assemble and install, which will not mar the appearance of the car, which are simple in construction, have no moving parts, and require no further attention when once adjusted. Other objects will be apparent from the detailed description which follows.

For the purpose of illustrating the invention, typical species of the genus constituting the invention are shown by way of example in the accompanying drawings, in which:—

Fig. 1 is a plan view of the front of an automobile showing the invention applied to the headlights thereof;

Fig. 2 is a side elevational view of the parts shown in Fig. 1;

Fig. 3 is an enlarged fragmentary plan view of a headlight with the invention applied thereto;

Fig. 4 is a sectional view on the line 4—4 of Fig. 3 showing the headlight in elevation;

Fig. 5 is a side elevational view partly in section, disclosing a modification; and Fig. 6 is a sectional view similar to Fig. 4 showing a mounting having a wider range of adjustment.

The embodiment of the invention chosen for the purpose of illustration and shown in Figs. 1 to 4 comprises a tell tale or reflecting attachment indicated generally by A, adapted to be secured adjacent to or directly upon the headlights B of a motor vehicle such as that partly shown in Figs. 1 and 2. The device comprises a support which may take the form of a frame 7 generally U-shaped in plan view, Fig. 3, the legs of which provide bearings for a shaft 8 upon which suitable reflecting surfaces 9 are mounted. In the form shown in Figs. 3 and 4 the reflecting surfaces 9 are struck up portions of plates 10, the latter being angularly disposed relative to each other and preferably integrally connected together at 11 and securely attached to shaft 8 which has fast thereon at either end washers 12 and nuts 13 between which the legs of the frame 7 are securely clamped, the clamping action being sufficient to hold plates 10 in adjusted position.

Frame 7 is adapted to be fastened in such position as to dispose one of the reflecting surfaces 9 in the line of rays of light emanating from headlights B for the purpose of diverting these rays to the other or upper reflecting surface 9 which as indicated in Fig. 4 projects slightly beyond the periphery of the headlight B so that the glow or illumination produced thereon by the diverted rays of light may be visible from the rear, that is, from the driver's seat. The preferred place for attachment of frame 7 is to the upper portion of the rim C of the headlight as indicated in the drawing by any suitable means such as screws 14. In Fig. 4 two positions of adjustment of the plates 10 carrying the reflecting surfaces 9 are indicated, one in full lines and the other in dotted lines. In the form therein shown the plates are disposed at substantially a right angle relative to each other but it is to be understood that the plates may be disposed at any angle found to be best adapted for the purpose.

In Fig. 5 is illustrated a modified form of tell tale or visual indicator having curved reflecting surfaces which are individually adjustable. It comprises a support or frame 17 attached to the rim C of the headlight B in the manner indicated in Figs. 3 and 4, the parallel legs of which support a shaft 18 from which extend arms 19 and 20 supporting reflectors 21 and 22 respectively which are individually adjustable about shaft 18 as an axis. Reflectors 21 and 22 as shown are spherical or parabolic in form but it is obvious that if desirable flat reflecting surfaces could be mounted in the same manner. As indicated the two curved reflecting members 21 and 22 may be mounted so that one may swing within the other in order to permit the maximum amount of adjustment, and when disposed in telescopic engagement as shown in Fig. 5 they present practically an unbroken reflecting surface. The method of mounting two individually adjustable reflecting surfaces in the manner shown in Fig. 5 obviously permits a great range of adjustment but if the angle between reflecting surfaces disposed at a fixed angle as indicated in Figs. 3 and 4 is properly determined the first form of the invention will be found to give entirely satisfactory results. The angular disposition of plates 10 may be changed by bending them together or apart along the uniting line or fold 11.

In Fig. 6 is shown a form of mounting for the device which provides a very wide range of adjustment and particularly adapts it for use on headlights having very wide rims. A U-shaped support or frame 7' in all respects similar to supports 7 and 17 is used and is attached to the headlight rim C in the same manner. The legs of the frame 7' support clamping bolts received in slots 15' in spaced arms 16 which have bearings at their free ends for shaft 8' upon which are secured the plates having the reflecting surfaces 9'. By this arrangement shaft 8' is adjustable toward or from the rim C within the limits of slots 15', arms 16 are angularly adjustable as desired about the axis of bolts 15 to position shaft 8' in the plane of the legs of frame 7' or above or below that plane, (see the broken line position of the parts in Fig. 6), and the reflecting surfaces 9' are then adjustable about shaft 8' as an axis.

To make the glow of the reflected light still more conspicuous at least a portion of one of the reflecting surfaces may be colored, this providing a colored spot or colored tinge to the glow and causing it to be more readily distinguishable from other illumination. One way of securing this effect is to mount on or in one of the reflecting surfaces a colored reflector such as a bit of colored glass 23 (Fig. 6) or other suitable material. So far as the result is concerned, it is immaterial whether the colored reflector is mounted on the upper or lower reflecting surface. By mounting the colored reflector 23 within the reflecting surface 9' so that it projects from and is visible from both sides of the plate 10' the attractiveness and decorative effect of the entire device is greatly enhanced both by day and by night. As shown the colored glass 23 may be cut or molded in the form of a jewel and may be of any desired color or of contrasting colors on the different lights as green on one headlight and red on the other.

While the parts of the adjustable reflecting devices herein described are intended to be constructed of metal, preferably a non-rusting metal such as brass, which may be nickeled or otherwise finished to make an attractive appearance, the reflecting surfaces may be of the same material or of any other material which will reflect light such as a painted or enameled surface, a polished metal surface, or a surface of glass, celluloid and the like. The colored effect above described may be effected by coloring all or a portion of one of the reflecting surfaces or a small colored reflector may be mounted on or in one of the reflecting surfaces. The type of surface used as a reflecting medium will determine to some extent the amount of light rays to be diverted which will be necessary to make the slight glow or illumination which is desired and not a strong reflection or glare which might blind the driver. The diverted light is reflected upwardly and rearwardly as indicated in Figs. 4 to 6 to produce a glow merely sufficient to be visible to the driver.

From the above it will be apparent that the reflecting indicator or tell tale herein disclosed can be readily constructed at low cost and quickly and easily installed, that when once installed and adjusted it needs no further attention, that it may be made very small and unobtrusive and of material and finish which will not detract from the appearance of the automobile to which it is applied, and that the slight amount of light rays diverted thereby is not sufficient to impair in any manner the efficiency of the headlights.

I claim:

1. An attachment for headlights comprising a U-shaped bracket adapted to be mounted on the rim of a headlight with its legs extending therefrom, and a reflector pivotally mounted between said legs, the reflector having two portions inclined to each other to reflect the light outwardly and then rearwardly.

2. An attachment for headlights comprising a U-shaped bracket adapted to be mounted on the rim of a headlight with its legs extending therefrom, arms pivoted to the outer ends of said legs, and a reflector mounted on the outer ends of said arms, whereby the reflector may be adjusted angularly and also radially of the headlight.

3. An attachment for headlights of the type having a detachable rim for retaining the cover glass, comprising a reflector whose length is somewhat greater than the width of the rim, and legs on opposite sides of the reflector intermediate its ends for attachment to the front of the rim, the upper end of the reflector being inclined rearwardly relatively to the lower ends.

4. An attachment for headlights comprising a reflector, and legs on opposite sides of the reflector for attachment to a headlight rim, the reflector having portions on opposite sides of said legs inclined relatively to each other conjointly to reflect light rearwardly.

Signed by me at Boston, Massachusetts, this 13th day of November, 1922.

CHARLES E. PARKHURST.